United States Patent Office 2,757,520
Patented Aug. 7, 1956

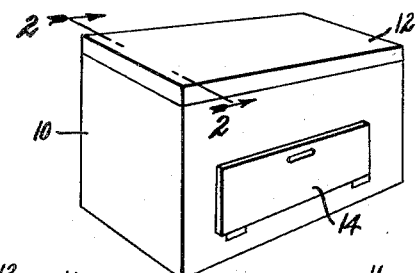
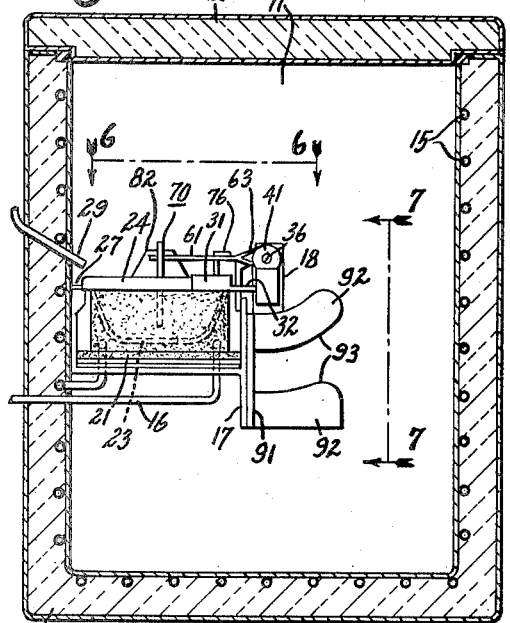
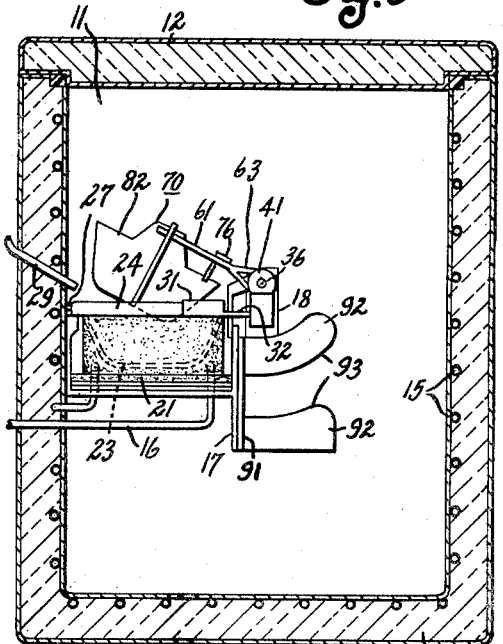
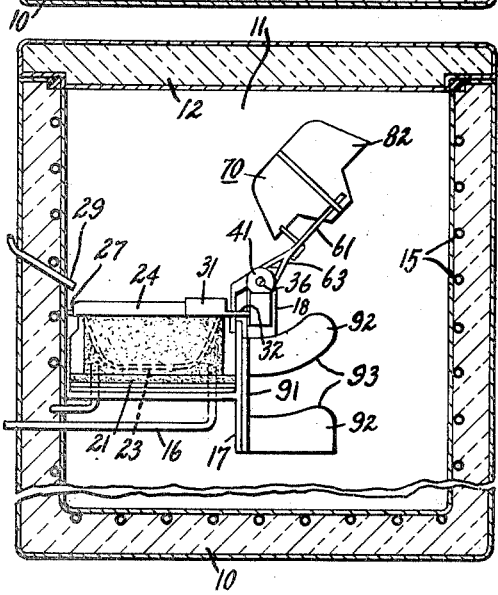
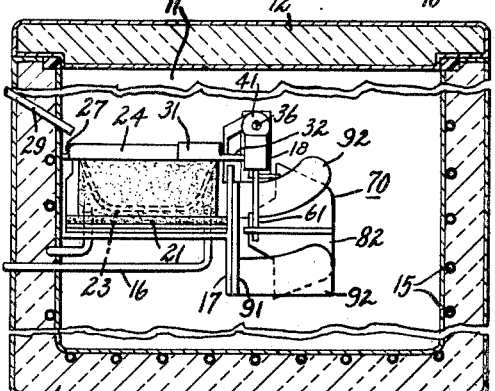

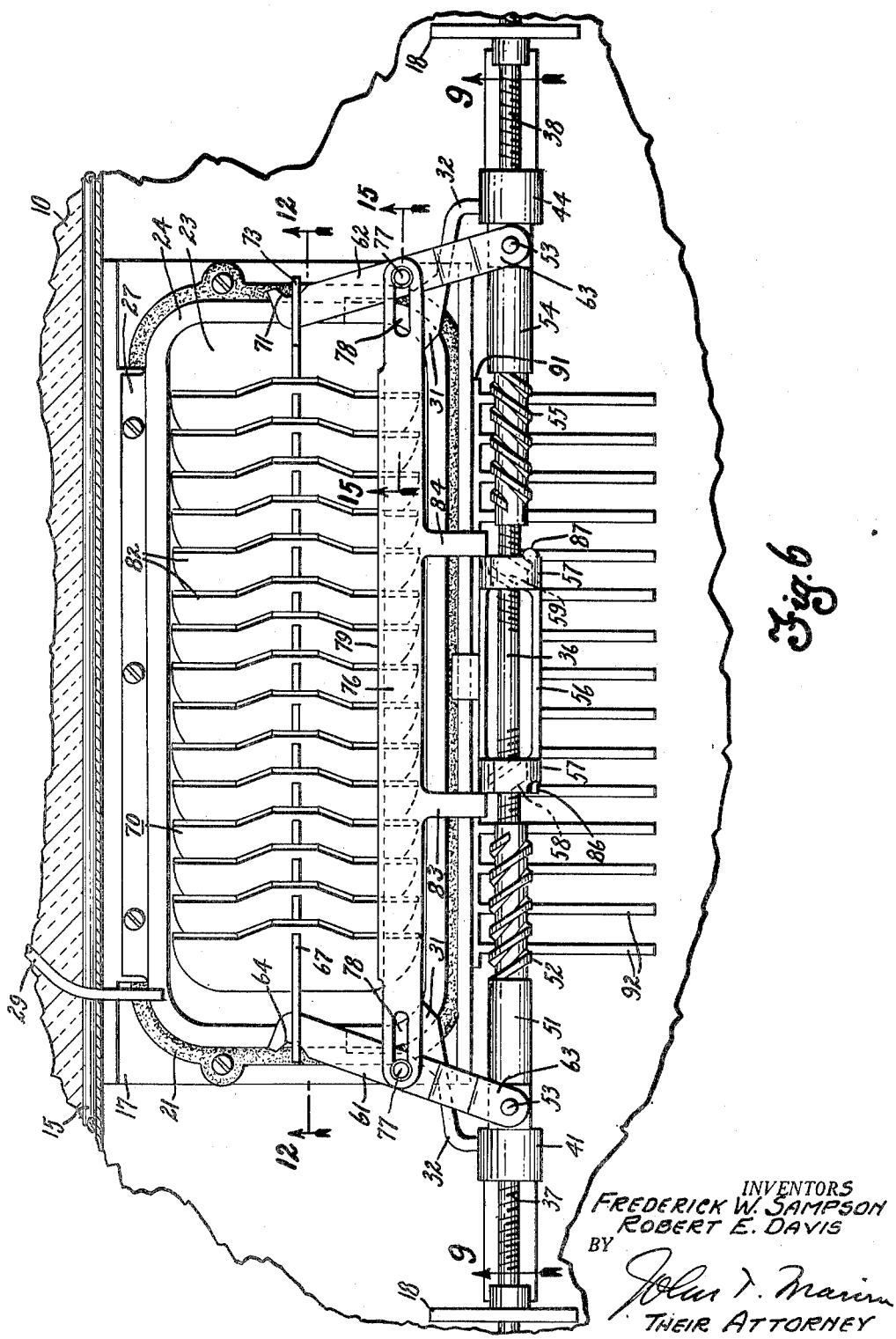

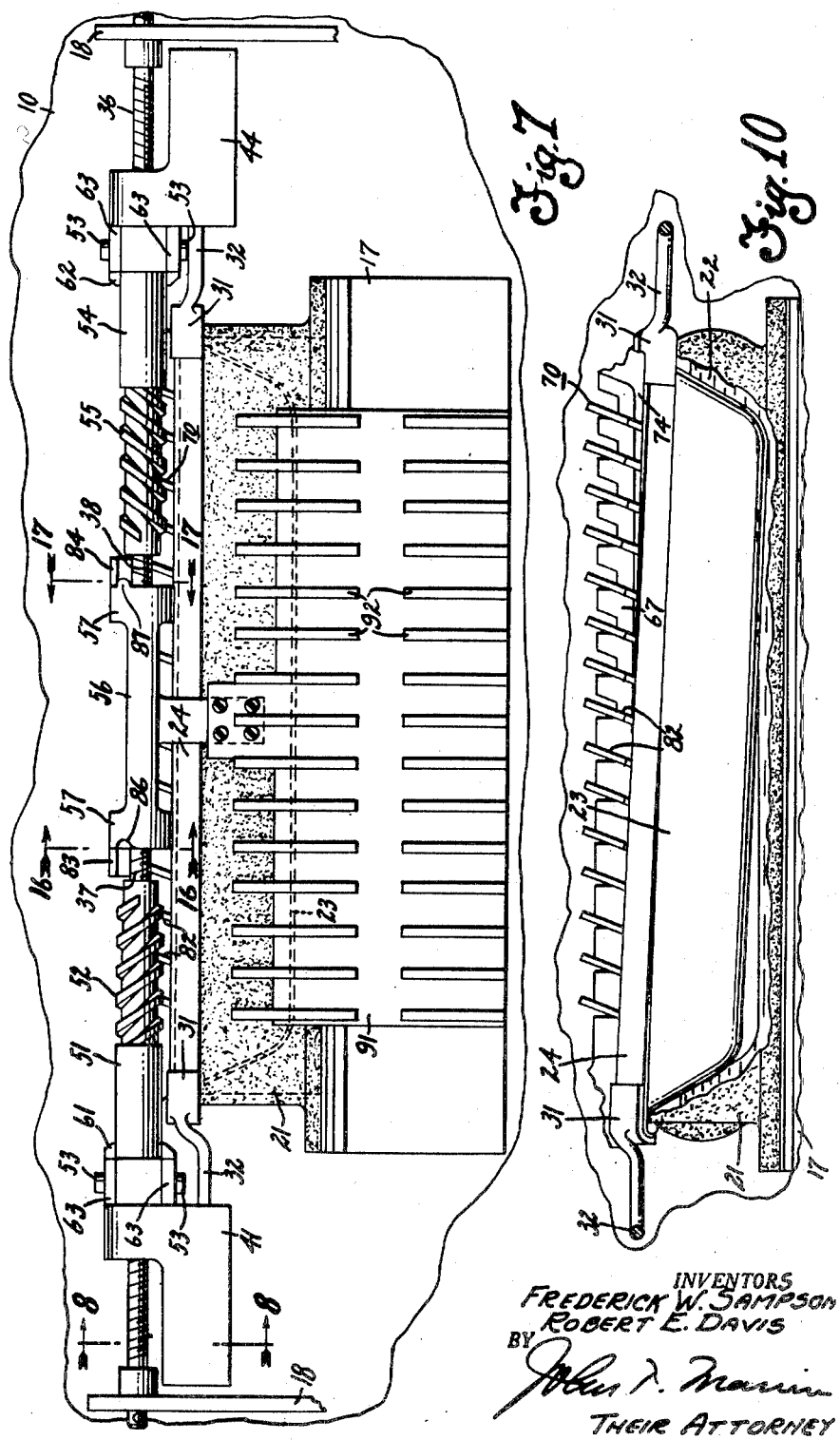

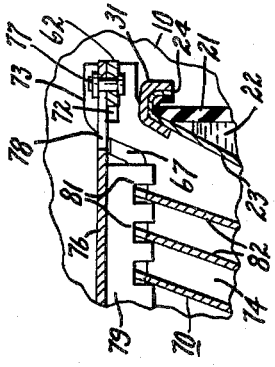
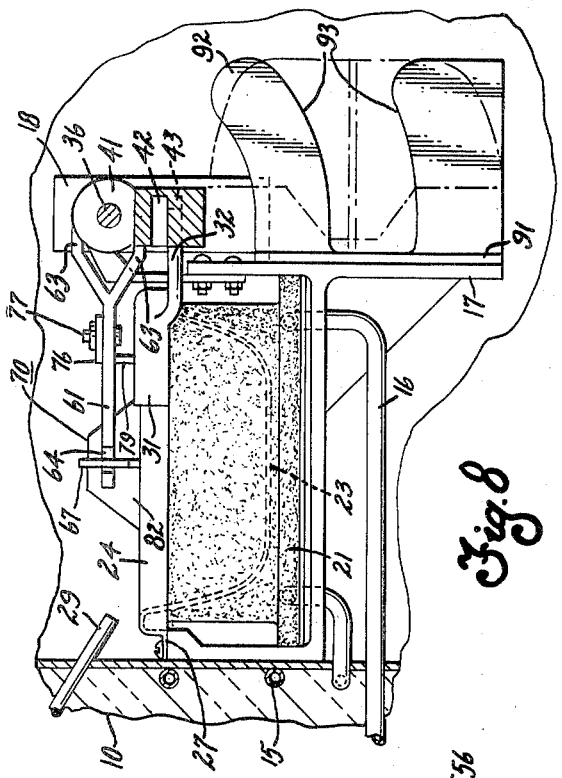
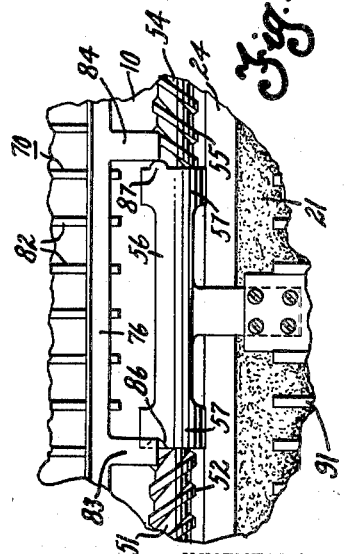
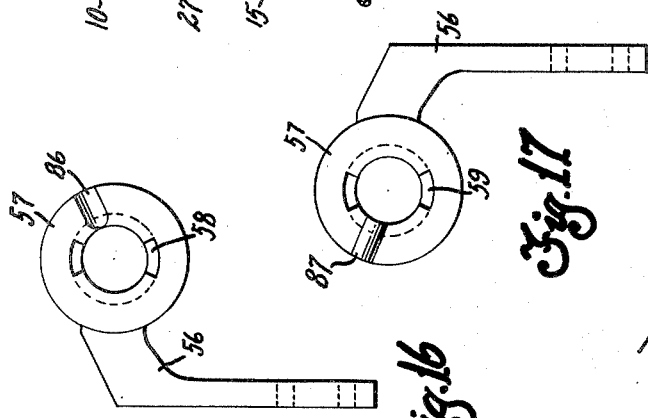
INVENTORS
FREDERICK W. SAMPSON
ROBERT E. DAVIS
BY
THEIR ATTORNEY

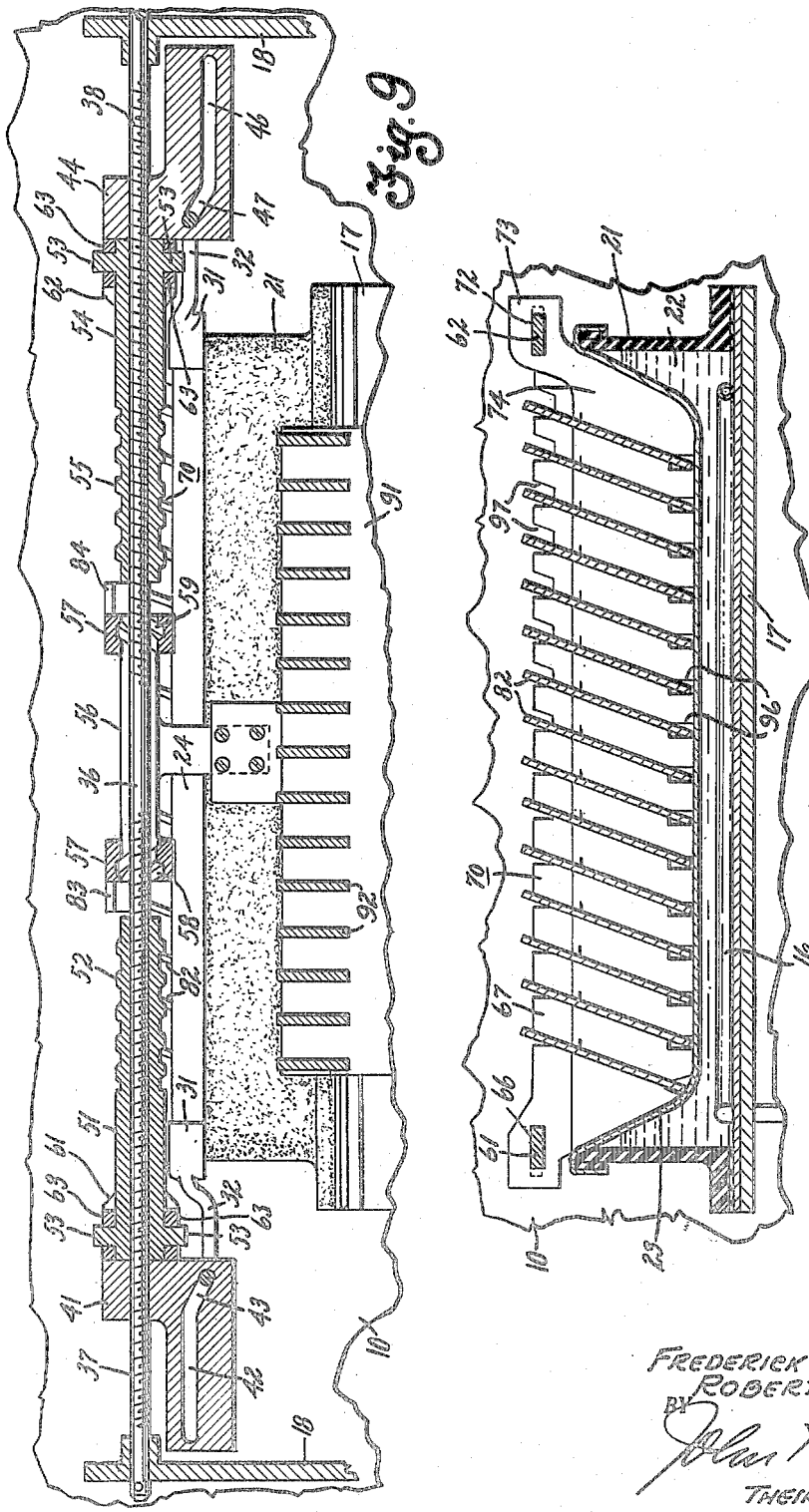

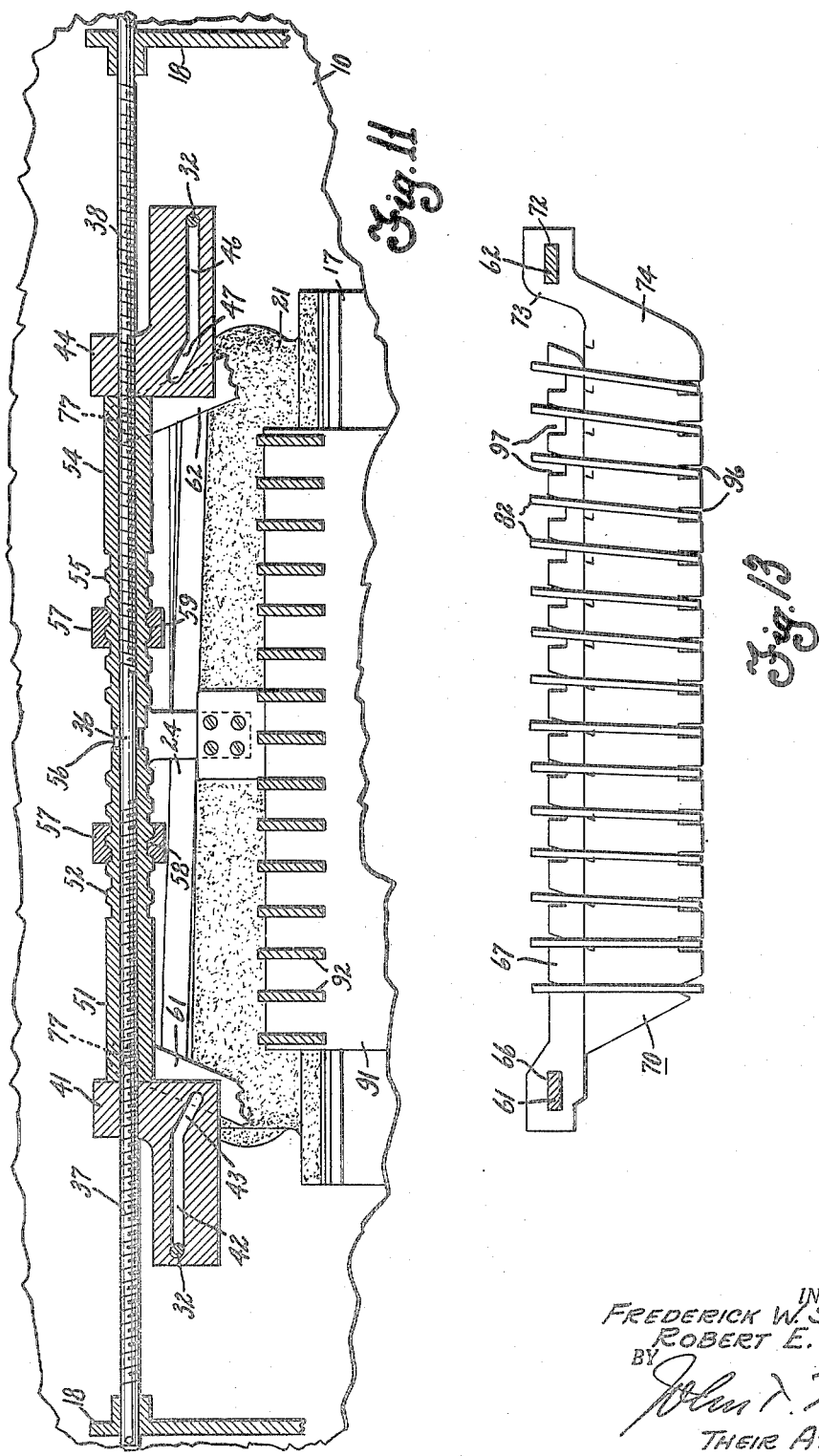

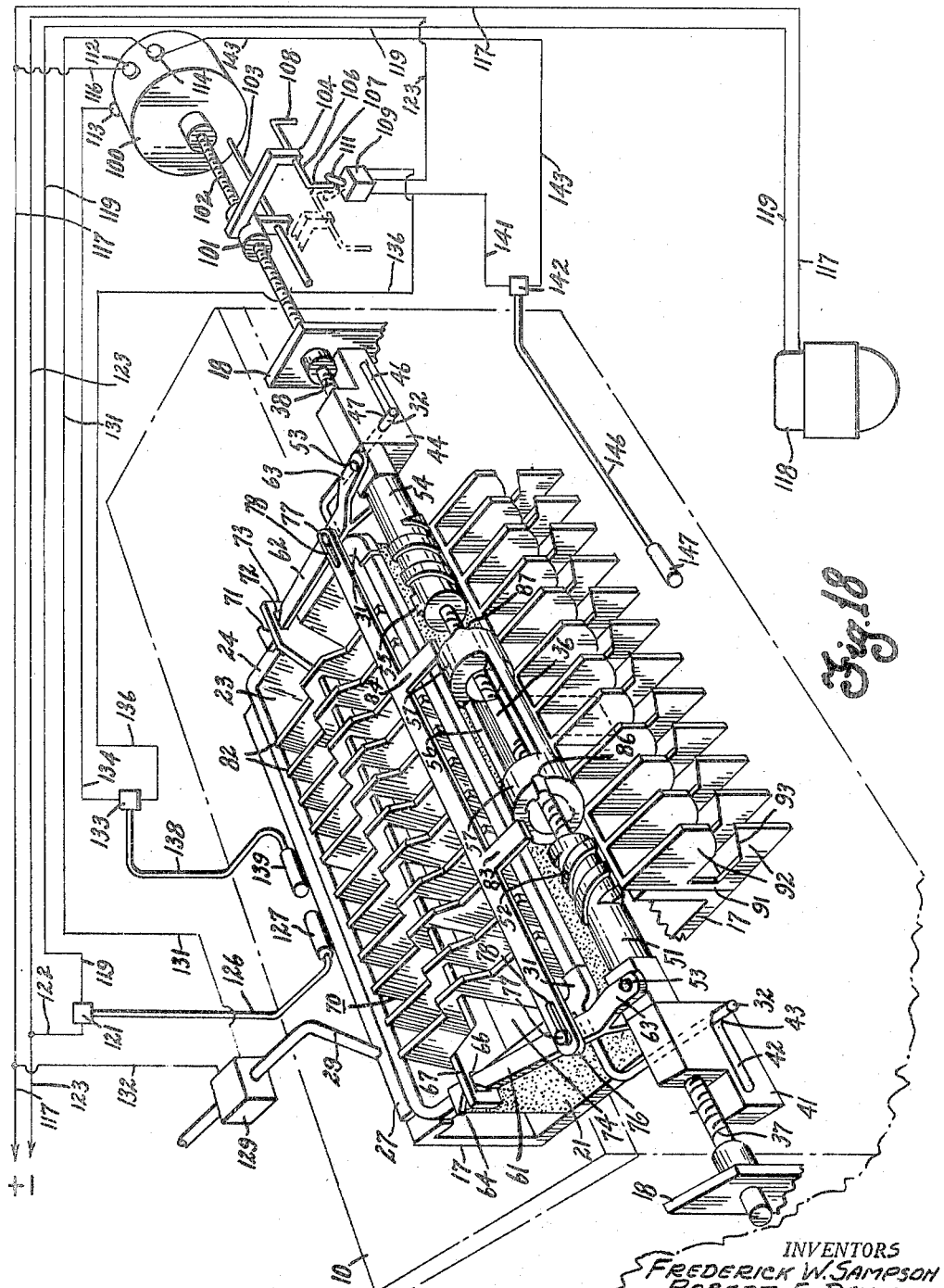

2,757,520

ICE MAKING APPARATUS

Frederick W. Sampson and Robert E. Davis, Dayton, Ohio, assignors to General Motors Corporation, Detroit, Mich., a corporation of Delaware Application March 15, 1955, Serial No. 494,328

9 Claims. (Cl. 62—106)

This invention relates to refrigeration and particularly to improvements in ice block making and harvesting apparatuses.

As is now well known, separated ice blocks in an ice block producing apparatus comprising a freezing device including a tray and a partitioning grid therein are difficult to be harvested, because they have a tendency to adhere both to the tray and to walls of the grid. In some apparatuses of this type heat is applied to the tray or to both the tray and the grid for breaking ice bonds and releasing ice blocks therefrom. The application of heat to a freezing device of this character renders the refrigerating system associated therewith inefficient, requires a considerable length of time between a freezing and an ice block releasing cycle of the apparatus, increases the hazard of short circuits and furthermore wets surfaces of the ice blocks, thus resulting in the blocks sticking or bonding together after they have been released from the device and collected in a storage zone or receptacle. It is contemplated to provide a refrigerating apparatus of an improved design which will make ice blocks and release separated blocks from the freezing device portion thereof without the application of heat thereto and wherein the ice blocks will not adhere to walls of the storage zone or receptacle, nor to each other after they have been released.

A general object of the present invention is to provide an automatic ice block freezing and discharging device in an ice making apparatus which will release separated ice blocks and store the same for future use so as to afford an ample supply of such ice blocks at all times.

Another object of the invention is to provide an ice block making apparatus with a freezing device portion including a stationarily mounted distortable tray and a pivotally mounted unitary movable walled grid structure therein wherein the stationary tray is mechanically flexed to break the bond between same and separated ice blocks adhering to walls of the grid to permit the grid structure, together with ice blocks therein, to be rotated about its pivotal mounting out of and over a side of the tray whereby walls of the grid can thereafter be moved relative to one another to release ice blocks therefrom.

A further object of the invention is to provide an ice block making apparatus including an insulated chamber maintained below 32° F. having a freezing device portion therein comprising a distortable stationary metal tray adapted to contain water to be frozen secured to a receptacle and contacted by a liquid heat transfer medium in the receptacle, cooled by an evaporator of a refrigerating system, and comprising a rigid movable metal walled unitary grid structure normally disposed in the tray with means for first mechanically flexing the tray, means for then rotating the grid out of the tray, means for thereafter progressively moving walls of the grid relative to one another in succession, means for then jarring the unitary grid structure to remove ice blocks therefrom and means for finally insuring that all ice blocks are released from the grid walls into a storage zone or receptacle.

In carrying out the foregoing objects, it is a still further object of the invention to provide an improved method of an apparatus for making ice blocks and releasing same from a freezing device portion of an ice maker without applying artificial heat to parts of the device whereby the intervals of time between ice block freezing cycles of the apparatus are decreased, the refrigerating system associated with the apparatus is rendered more efficient and the ice block producing capacity of the freezing device portion of the apparatus is increased.

Further objects and advantages of the present invention will be apparent from the following description, reference being had to the accompanying drawings, wherein a preferred form of the present invention is clearly shown.

In the drawings:

Figure 1 is a perspective view of a cabinet having an insulated chamber therein in which the freezing device portion of the present ice making apparatus is disposed;

Figure 2 is an enlarged vertical sectional view through the cabinet shown in Figure 1 and taken on the line 2—2 thereof disclosing the freezing device portion of the apparatus in a normal ice block freezing position;

Figure 3 is a view similar to Figure 2 showing a unitary grid structure of the freezing device portion of the apparatus rotated out of a stationarily mounted tray thereof;

Figure 4 is a view similar to Figures 2 and 3 showing the unitary grid structure in a further rotated position relative to the tray at which position walls of the grid are moved relative to one another;

Figure 5 is a view similar to Figures 2, 3, and 4 showing the unitary grid structure of the freezing device portion of the apparatus rotated into association with a comb like element on the device;

Figure 6 is a top view of the freezing device portion of the apparatus taken on the line 6—6 of Figure 2 showing a grid in a normal ice block freezing position in a tray;

Figure 7 is a side elevational view of the freezing device portion of the apparatus taken on the line 7—7 of Figure 2;

Figure 8 is an end sectional view taken on the line 8—8 of Figure 7 showing supports for various elements of the freezing device;

Figure 9 is a sectional view taken on the line 9—9 of Figure 6 showing parts of the grid rotating mechanism in a normal ice block freezing position;

Figure 10 shows the metal tray of the freezing device portion of the apparatus twisted from end to end thereof;

Figure 11 is a sectional view similar to Figure 9 showing parts of the grid rotating mechanism in a position attained thereby after the tray has been flexed and the grid has been fully rotated relative to the tray of the device;

Figure 12 is a sectional view taken on the line 12—12 of Figure 6 showing walls of the grid structure of the device in a normal ice block freezing position in the tray;

Figure 13 is a view showing walls of the rotatable unitary grid structure moved relative to one another;

Figure 14 is a fragmentary side view of a portion of the device showing means thereon for jarring the unitary grid structure thereof after its walls have been moved relative to one another as illustrated in Figure 13;

Figure 15 is a fragmentary sectional view taken on the line 15—15 of Figure 6 showing the tray sealed to the top of walls of a liquid heat transfer containing receptacle;

Figure 16 is a view taken on the line 16—16 of Figure 7 showing a groove formed in one end of a boss on a stationary yoke member of the device;

Figure 17 is a view taken on the line 17—17 of Figure 7 showing a lug formed on one end of a boss on the stationary yoke member of the device; and Figure 18 is a perspective showing of the freezing device portion of the ice making apparatus disclosing diagrammatically driving means and controls therefore.

Referring to the drawings, for illustrating the present invention, there is shown in Figure 1 thereof a cabinet 10 having a plurality of insulated walls forming a freezing chamber 11 therein (see Figures 2, 3, 4, and 5) containing the freezing device portion of the present ice block making apparatus. Cabinet 10 is provided with a movable insulated top 12 for permitting access to the freezing device in chamber 11 for inspection or repair thereof. Cabinet 10 is also provided with an opening permitting access to ice blocks in chamber 11 and this opening is normally closed by an insulated door 14 hingedly mounted on the cabinet. Chamber 11 is cooled to a temperature well below 32° F. by a refrigerant evaporating portion 15 of a closed refrigerating system (not shown) associated with cabinet 10 and this system also includes another refrigerant evaporating portion 16 (see Figure 12) associated with a part of the freezing device within the chamber. The refrigerating system is preferably arranged to operate continuously or until a predetermined low temperature has been produced in the freezing device portion of the ice block making apparatus. Operation of the ice block freezing and releasing device portion of the apparatus may be terminated at any time a sufficient or desired amount of ice blocks has been accumulated in chamber 11. The freezing device portion of the present apparatus is supported by supports in the upper part of chamber 11 so that the lower part of this chamber forms a receptacle or zone for receiving and storing, in dry form at temperatures below 32° F., ice blocks released from the freezing device. Ice blocks may be harvested from chamber 11 by opening door 14 and removing same therefrom.

In the present apparatus, a support comprising brackets 17 and 18 may be secured, in any suitable manner, to walls of chamber 11 for supporting various parts of the freezing device therein. One of these brackets 17 (see Figures 2 to 5 and 8) supports a rubberlike resilient walled receptacle 21 containing a fluid heat transfer medium, indicated at 22 (see Figure 12), preferably of liquid form, such, for example, as a brine solution which may be composed of salt and water or alcohol and water so as to be non-freezable at the low temperature at which ice blocks are frozen. A distortable resilient metal tray or pan 23 stationarily rests upon receptacle 21 and has its bottom and sides depending into the receptacle and contacting the liquid transfer medium 22 therein. A fluid seal is provided intermediate a rolled over rim 24 on tray 23 and receptacle 21 (see Figure 12). The vertical walls of receptacle 21 are resilient to permit flexing of the stationary metal tray in a manner and for a purpose as will be hereinafter described. Receptacle 21 contains the refrigerating evaporating conduit or coil portion 16 of the refrigerating system associated with cabinet 10 for cooling the heat transfer liquid 22 to a very low temperature. Pan or tray 23 is adapted to receive water to be frozen by conducting the heat thereof through walls of the tray and through the hold-over body of liquid 22 to refrigerant in conduit or coil 16. Rim 24 on one side of tray 23 is provided with an integral lip 27 which is stationarily secured by screws or the like to a part of the bracket 17 (see Figures 6 and 8). Tray 23 is formed of thin sheet metal and while rim 24 tends to reinforce same and its one side is stationarily supported, it is, nevertheless, capable of being mechanically flexed or twisted to break a bond between the tray and ice blocks formed therein. The tray 23 herein described as being stationary or stationarily mounted is intended to be distinguished from similar apparatuses wherein the tray is swung relative to its support and/or relative to a grid therein and is not intended to mean that the tray cannot be flexed or distorted while being so mounted. Water to be frozen is directed into tray 23 by way of an upwardly inclined tube 29 leading through a wall of cabinet 10 (see Figures 2 to 5 and 6 and 8) to a metering device or valve having a connection to a source of water supply. Metal pieces 31 secured to the rim 24 of tray 23, as by welding the same to a corner at each end of the tray, are each provided with a projection 32 (see Figures 6, 8, and 10) adapted to be received in cam members to be presently described.

The pair of brackets 18 rotatably support a rod 36 which has its one end extending through a wall of cabinet 10. Rod 36 is positioned at and extends along the one side of tray 23 opposite the side thereof which is secured to the bracket 17. One portion of rod 36 is threaded in one direction as at 37 and another portion thereof is threaded in an opposite direction as at 38 (see Figures 6, 9, and 11). A cam member 41 (see Figures 7 and 9) adjacent one bracket 18 is threaded upon the threads 37 of rod 36 and is provided with a hollowed out camming slot including a straight horizontal walled portion 42 and an angular downwardly directed walled portion 43 (see Figures 9 and 11). A similar cam member 44 adjacent the other bracket 18 is threaded upon the threads 38 of rod 36 and is provided with a hollowed out camming slot including a straight horizontal walled portion 46 and an angular upwardly directed walled portion 47. The projections 32 on each of the metal corner pieces 31 are received in the camming slot of cam members 41 and 44 and prevent rotation of these cam members when rod 36 is rotated. A cam shank or collar 51, spirally splined in one direction as at 52, is threaded upon the threads 37 of rod 36, adjacent cam member 41, and is provided with integral round outwardly projecting opposed studs 53. A similar cam shank or collar 54, spirally splined as at 55 in a direction opposite the direction of spline 52 on shank 51, is threaded upon the threads 38 of rod 36 adjacent cam member 44 and is also provided with the integral outwardly projecting opposed round studs 53. A yoke member 56 is provided with bosses 57 each internally splined in opposite directions relative to one another as at 58 and 59 is adapted to receive the spline 52 on collar 51 and the spline 55 on collar 54 respectively. This yoke member is mounted centrally of the freezing device portion of the apparatus as by a tail portion thereof being rigidly secured to the bracket 17 (see Figures 7 and 9). A yoke lever 61 is connected to collar or camming shank 51 and a similar yoke lever 62 is connected to the other collar or camming shank 54 (see Figures 6 and 8). The legs 63 of each yoke lever 61 and 62 have round holes therein which fit over the opposed studs 53 on shanks or collars 51 and 54 to connect them thereto for pivotal movement about rod 36. The end of yoke lever 61 opposite the legs 63 thereof is notched out as at 64 and fits into a slot 66 provided in an upper section 67 of a longitudinal wall of a unitary grid structure (see Figures 6 and 12), generally represented by the reference character 70 to be presently described. The end of yoke lever 62 opposite the lever 63 thereof is notched out as at 71 and fits into a slot 72 provided in an upstanding end portion 73 of a lower section 74 of the longitudinal wall of grid 70 (also see Figures 6 and 12). A metal link 76 extends between the levers 61 and 62 (see Figure 6) and a pin or stud 77 secured to these levers fit in elongated openings 78 provided at each end of link 76 to thereby connect yoke levers 61 and 62 to one another. Yoke levers 61 and 62 together with link 76 are adapted to be rotated about rod 36 by their connection with the studs 53 on camming shanks or collars 51 and 54. This link 76 has an integral depending part 79 slotted as at 81 (see Figure 15) for receiving the upper portion of a plurality of cross or transverse walls 82 of grid structure 70. The walls of slots 81 in depending part 79 of link 76 engage transverse walls 82 of the grid 70 and serve to insure the return of these walls to their normal inclined position within tray 23 when the grid structure is moved into the tray. The metal link 76 has two integral laterally extending spaced apart fingers 83 and 84 thereon which straddle yoke member 56 and abut opposed ends of bosses 57 thereon (see Figure 6). The end of one boss 57 on yoke member 56 has a curved walled groove 86 therein (see Figure 16) and the end of the other boss 57 has a raised curved lug 87 formed thereon (see Figure 17). Groove 86 and lug 87 form means for imparting a jar to the unitary grid structure 70 in a manner and for a purpose as will be hereinafter described. A comb like element 91 has its vertical backbone portion stationarily mounted on bracket 17, by being bolted or welded thereto, and includes a plurality of integral laterally extending spaced apart teeth 92 cut away as at 93 (see Figure 8). This comb like element is employed as a safety means in the present apparatus for insuring removal of all ice blocks from walls of the grid 70.

The unitary grid structure 70 comprises a rigid metal longitudinal wall, including the upper and lower wall sections 67 and 74 respectively and the plurality of rigid metal transverse or cross walls 82. All of the grid walls are movably interlocked together and the transverse walls 82 are adapted to be progressively tilted toward the vertical in succession relative to the longitudinal wall. The bottom edge of lower section 74 of the longitudinal wall of unitary grid structure 70 is provided with spaced apart notches 96 and the top edge of upper section 67 of the longitudinal wall is provided with the spaced notches 97 which are progressively wider with respect to one another from one end to the other end of the longitudinal grid wall (see Figure 13). Both sets of notches 96 and 97 receive a portion of the transverse walls 82 to movably interlock these walls to the wall sections 67 and 74 of the longitudinal grid wall. The transverse grid walls 82 normally lie in an inclined plane relative to the vertical and are adapted to be moved toward the vertical to loosen ice blocks adhering thereto therefrom. The general construction of grid structure 70 is not new per se and the method of assembling parts thereof together and the mode of moving the grid walls are more fully and specifically described in existing patents, such, for example, as in the Donald H. Reeves Patent No. 2,219,079, issued October 22, 1940.

Since various different arrangements may be employed for driving or rotating rod 36, for controlling the water supply means and other controls for the apparatus, it is desired to first explain the mechanical movements of parts of the freezing device portion thereof. In respect to this it should be assumed that parts of the device are in their normal ice block freezing position as shown in Figures 1, 6 and 8 of the drawings and a predetermined amount of water has been flown by way of conduit or tube 29 into the tray 23, with the unitary grid structure 70 position therein to divide the interior thereof into a plurality of ice block forming compartments. The water is frozen into ice blocks bonded to tray 23 and to walls of grid structure 70 by the refrigerating effect of the refrigerant evaporator conduit 16 and the low temperature of the liquid heat transfer medium 22. The unitary movable rigid walled grid structure 70 is adapted to be swung or rotated relative to the stationary tray 23 for removing ice blocks therefrom and for releasing ice blocks from walls of the grid 70 whereby these ice blocks will fall into the frozen storage zone within the lower part of the chamber 11 of cabinet 10. Rotation of rod 36, under the control of an electric motor or the like, causes the cam members 41 and 44 threaded on this rod to move therealong in opposite directions relative to one another and specifically toward each other. As cam members 41 and 44 move in a direction toward each other the splined camming shanks or collars 51 and 54 threaded upon the threads 37 and 38 respectively of rod 36 also move along this rotating rod in a direction toward one another. During this initial movement of cam members 41 and 44 and of shanks or collars 51 and 54 the leg ends 63 of yoke levers 61 and 62 also move toward one another to shift the pins or studs 77 carried thereby within the elongated opening 78 provided in link 76, without at this time transmitting any force to the grid structure 70. This initial movement is utilized to flex and twist the distortable metal tray 23 for breaking a bond between its walls and ice blocks therein adhering to walls of the unitary grid structure. Such is accomplished by the integral projections 32 on the metal pieces 31, secured to corners of tray 23, moving from the bottom portion 43 into the straight portion 42 of the camming groove in cam member 41 and from the upper portion 47 into the straight portion 46 of the camming groove in cam member 44 (see Figure 11). Shifting of cam member 41 along rod 36 to move the projection 32 as described causes corner piece 31 at the one end of tray 23 to apply an upward force thereto while shifting of cam member 44 along rod 36 to move the projection 32 within the groove of this member causes corner piece 31 at the other end of tray 23 to apply a downward force thereto (see Figures 10 and 11). These forces applied to opposite ends of tray 23 and in opposite directions relative to one another flexes and twists the stationarily mounted tray from end to end thereof to break its walls loose from ice blocks therein which ice blocks at this time remain bonded to walls of the grid structure 70 within tray 23. This twisting of metal tray 23 takes place by a small amount of flexure thereof and is somewhat exaggerated in Figures 10 and 11 of the drawings in order to clearly illustrate same. While the tray 23 is stationarily mounted in the device the resiliency of upright walls of the rubber-like receptacle 21 permits them to be sufficiently stretched and/or compressed or bowed to enable flexing or twisting of the metal tray as described. Continued rotation of rod 36, after tray 23 has been twisted, causes the splines 52 and 55 on shanks or collars 51 and 54 respectively to simultaneously enter the splines 58 and 59 in the bosses 57 on stationary yoke member 56. As the shanks 51 and 54 thread further toward one another into yoke member 56 splines 52 and 55 cooperate with the splines 58 and 59 respectively and function to rotate the shanks or collars 51 and 54 about rod 36. Rotation of shanks 51 and 54 also revolves the yoke levers 61 and 62 and the link 76 relative to tray 23 and this revolution of these elements transports or swings the unitary grid structure 70 together with ice blocks bonded to walls 67, 74 and 82 thereof out of and over a side of tray 23 (see Figures 3 and 4). The yoke levers 61 and 62 remain ineffective to impart a force to wall sections 67 and 74 of grid 70 to move them lengthwise relative to one another until the grid structure has been swung upwardly and over a side of tray 23 into a substantially 45° angle relative thereto as shown in Figure 4 of the drawings. After the grid structure 70 has been rotated to the substantially inverted position thereof disclosed in Figure 4 the pins or studs 77 come into engagement with the ends of elongated openings 78 in link 76 and further threading movement of camming shanks or collars 51 and 54 toward one another along rod 36 (see Figure 11) causes the levers 61 and 62 to pivotally move about the pins or studs 77. This pivotal movement of levers 61 and 62 causes their notched ends 64 and 71 to apply opposed longitudinal forces to the wall sections 67 and 74 of the central wall of grid structure 70. Such forces pull the wall sections 67 and 74 in opposite directions relative to one another and the side wall of notches 97 in wall section 67 progressively engage and tilt the transverse walls 82 of the unitary grid structure 70 relative to one another in succession throughout the length of the grid toward the vertical (see Figure 13). Movement of walls of grid 70 in this manner breaks the bond between these walls and ice blocks adhering thereto. The fingers 83 and 84 on link 76, by engaging the bosses 57 on the stationary yoke member 56 while rotating grid 70, normally holds this link centrally with respect to the elongated tray 23. Further rotary movement of the grid structure 70 about rod 36, after walls thereof have been moved as described, causes the finger 84 to ride upon the lug 87 on the boss 57 of yoke 56 and the finger 83 to simultaneously ride into the groove 86 in the other boss of yoke 56 (see Figure 14). This shifts the link 76 sidewise relative to yoke 56 and its shifting takes place with a somewhat snap action so as to impart a jar to the unitary grid structure 70, after its walls have been moved. Jarring of grid structure 70 momentarily shakes same and causes it to tremble whereby ice blocks are loosened from walls thereof and released therefrom which ice blocks fall out of the grid into the bottom of the frozen storage zone of chamber 11 of cabinet 10.

The direction of rotation of rod 36 could now be reversed so as to return all parts of the freezing device portion of the apparatus to their normal ice block forming or producing position. However, there is provided a safety means in the present device which insures the removal of all ice blocks from walls of grid structure 70 prior to its being returned to its normal position within tray 23. This means is in the form of the comb like element 91 stationarily mounted in the path of rotation of grid 70 and this grid is revolved into same to cause its teeth 92 to enter the space between the grid walls 82 before the grid structure 70 is rotated or swung back into tray 23. Thus, if an ice block or several of such blocks should stick to the grid, after its walls have been moved as hereinbefore described, continued rotary or swinging movement of the unitary grid structure 70 in a clockwise direction over or into the comb like element 91 will insure that all ice blocks will be removed from walls of the grid. The purpose of cutting away the spaced apart teeth 92 of comb 91, as at 93, is to provide a clearance therein for receiving parts of the grid structure 70 when the grid is moved into the comb.

Referring now to Figure 18 wherein the freezing portion of the apparatus is shown in perspective, there is diagrammatically shown controls for automatically and/or intermittently operating the ice maker. In this showing an electric reversable motor 100 is connected to the end of rod 36 which projects outwardly of cabinet 10. A threaded nut 101 is mounted on threads 102 on rod 36 directed in the same direction as the threads 38 thereon. Nut 101 is adapted to travel along rod 36 and is held against rotation relative thereto by a retainer 103. A bar 104 carried by nut 101 has a member 106 secured thereto and provided with fingers 107 and 108. A three way electric motor reversing snap switch 109 is provided with an actuating toggle lever 111. Motor 100, being of the reversable type, is provided with two different field windings for causing its rotor to rotate rod 36 in opposite directions as is well known to those skilled in the art. The windings of motor 100 each have a common terminal connection 112 and each has a connection to separate terminal connections 113 and 114. Wire 116 connects the common motor winding terminal 112 to power line 117 which line also leads to the motor of a sealed motor-compressor unit 118 of the refrigerating system associated with the ice block making apparatus. A wire 119 leads from the motor of unit 118 to an electric snap switch 121 having another wire 122 extending therefrom and connected to the other power line 123 which also leads to a movable contact in switch 109. Switch 121 is thermostatically actuated by a fluid sealed in a tube 126 and a thermal bulb 127 disposed in heat exchange relationship with the receptacle 21 or with tray 23 of the freezing device portion of the apparatus. Switch 121 is normally closed to energize the motor of unit 118 for operating the refrigerating system to reduce the temperature in chamber 11 of cabinet 10 and to reduce the temperature of the liquid heat transfer medium 22 in receptacle 21 and, consequently, the temperature of tray 23. This switch 121 forms a safety means and is opened in response to abnormally low temperatures only of the freezing device portion of the apparatus to terminate the refrigerating effect produced by the refrigerant evaporator portions 15 and 16 of the refrigerating system. A solenoid operated valve 129 has a wire connection 131 with the terminal 114 on motor 100 and another wire connection 132 with the power line 117. Valve 129 is connected to a source of water supply and controls the flow of water through pipe 29 to tray 23 of the freezing device portion of the ice block maker. Another thermostatically operated electric snap switch 133 has a wire connection 134 with the terminal 113 on motor 100. A wire 136 leads from switch 133 to one of the stationary contacts in the three way switch 109. A fluid sealed within a tube 138 and a bulb 139, located in thermal relationship with tray 23, is utilized to actuate switch 133. The other stationary contact in three way switch 109 has a wire connection 141 to a normally closed thermostatically operated electric snap switch 142 which has a wire 143 leading therefrom to the motor terminal 114. Switch 142 is actuated by a fluid sealed within a tube 146 and a bulb 147 located in the lower ice block storage zone of chamber 11 of cabinet 10.

Switch 133 is normally open during operation of motor compressor unit 118 of the refrigerating system to freeze water in tray 23 into ice blocks. When the ice blocks become hard frozen in tray 23 and in the unitary grid structure 70 located therein switch 133 is actuated into closed position, by contraction of the fluid in tube and bulb 138 and 139 respectively, in response to the temperature of tray 23. Closing of switch 133 completes an electric circuit from power line 117, wire 116, a winding in motor 100 connected across the terminals 112 and 113, wire 134, wire 136 through the three way switch 109 to the other power line 123. Motor 100 is so energized and operates to drive or rotate rod 36 in one direction. Rotation of rod 36 in this one direction in addition to causing flexing or twisting of the stationary metal tray 23 as shown in Figure 10, transporting or swinging of grid structure 70 out of tray 23 as shown in Figure 3, moving walls of grid 70 relative to one another as shown in Figures 4 and 13, jarring of the grid structure 70 and movement thereof over the comb like element 91, as shown in Figures 5 and 11 and by the dot-dash lines in Figure 8, in succession as previously described also threads the nut 101 in a direction away from motor 100 along rod 36 to move the bar 104 and member 106 into the dot-dash line position shown in Figure 18. During this movement of nut 101 finger 107 on member 106 travels away from lever 111 on the three way switch 109 and the other finger 108 on member 106 travels toward and engages the lever 111 to trip switch 109. Electric current cannot flow through the winding of motor 100 connected across its terminals 112 and 113 and the motor thereby momentarily stops. Tripping of lever 111, of three way switch 109 as described, causes power line 123 attached thereto to be connected to wire 141 on the other stationary contact of switch 109. A different electric circuit is now established to cause rotation of rod 36 in a direction opposite its first mentioned direction of rotation. The connection of power line 123 with wire 141, through the three way switch 109, now directs electric current through the winding of motor 100 connected across its terminals 112 and 114 by way of power line 117, wire 116, wire 143 and closed switch 142 back to power line 123. Motor 100 now reversely rotates rod 36 to swing the grid structure 70 and other parts of the freezing device portion of the apparatus from the position thereof shown in Figure 5 of the drawings back into tray 23 as shown in Figures 2, 8, and 12. Wire 131 being connected to terminal 114 of motor 100 and to wire 143 now communicates with power line 123 and wire 132 being connected to power line 117 energizes the solenoid valve 129 when motor 100 is reversed. Opening of valve 129 permits a predetermined amount of water to flow into tray 23 while motor 100 is operating rod 36 to return grid structure 70 to its normal freezing position in the tray. When the finger 107 on the three way switch actuating means engages the lever 111 on switch 109 it trips this switch stopping the flow of electric current through motor 100 and deenergizes valve 129 to permit it to close and terminate the flow of water into tray 23. The electric circuit just previously energized is now broken due to the fact that the heat of water entering tray 23, while the apparatus functioned to return grid 70 to tray 23, causes fluid in the thermal element tube 138 and bulb 139, of snap switch 133 to expand and open this switch prior to the time finger 107 engages lever 111 of the three-way switch 109. The mechanism for flexing tray 23, for rotating grid 70 out of the tray, for moving walls of the grid, for jarring the grid structure 70 and for swinging the grid over the comb element now remains idle until snap switch 133 is again closed in response to hard freezing of ice blocks in tray 23. Snap switch 142 is interposed between the wires 141 and 143 so that at any time its thermal unit, tube 146 and bulb 147, responds to a predetermined accumulation of ice blocks in the storage zone of chamber 11 of cabinet 10, the circuit through motor 100 will be opened only during return swinging movement of the grid construction 70. The water valve 129 is also deenergized by opening of bin thermostat switch 142 and will thereupon close to stop flow of water into tray 23 when the return movement of grid structure 70 is interrupted.

It is to be understood that the controls herein disclosed may be changed to other types of controls or switches without departing from the spirit of the present invention. For example, switch 142 could be substituted by any suitable ice block accumulation sensitive device such as a weight responsive switch or the like. The electric circuit of the present apparatus may be changed to an arrangement whereby to permit the occurrence of a selected predetermined number of freezing and ice block releasing cycles and then cause the entire apparatus to be inactive until manually reinstated for operational cycles. Also, a safety device may be included in the apparatus so as to prevent injury to the motor and to other parts of the operating mechanism and such device could be in the form of a thermal overload located in motor 100. If, for any reason, it is desired to shorten the length of time water is directed into the freezing tray 23 from pipe 29, solenoid valve 129 may be replaced by a dump valve which could be mechanically operated by a cam or the like coordinated with movement of the grid structure or other parts of the operating mechanism.

It should be apparent that this invention provides improvements in ice block making apparatuses and particularly that improvement of rendering the application of artificial heat to any part or parts of the freezing device portion of the present apparatus unnecessary. By flexing the stationary metal tray in the present device ice blocks bonded to walls of a grid structure can be readily removed from the tray along with the grid. By moving walls of a unitary grid structure, after it has been swung or transported over a side of the tray, relative to one another as herein described ice blocks are released from the grid and stored in dry form to prevent sticking or bonding together of the blocks. While a separate cabinet, which can be mounted on a counter or bar or on any other desired place, houses the freezing device portion of the present apparatus, it is to be understood that this portion of the apparatus is capable of being incorporated in the freezing or frozen food storage compartment or chamber of household refrigerator cabinets now in existence or those to be manufactured in the future.

While the form of embodiment of the invention as herein disclosed constitutes a preferred form, it is to be understood that other forms might be adopted, as may come within the scope of the claims which follow.

What is claimed is as follows.

1. In an ice making apparatus, the combination of an insulated chamber having a freezing device therein including a stationary tray and a unitary grid structure removably disposed in said tray, said grid structure having walls movably interlocked together for dividing the interior of said tray into a plurality of compartments in which water is to be frozen into ice blocks, a support for supporting said device in said chamber, an ice block receiving and storage zone in said chamber, means for movably mounting said unitary grid structure within said chamber in association with said stationary tray, mechanical means for transporting said grid together with ice blocks bonded to walls thereof upwardly out of and over a side of said stationary tray beyond the vertical plane occupied thereby, and said mechanical means including means for moving walls of said unitary grid structure relative to one another, after the grid structure has been transported over said side of said stationary tray, to break the bond between ice blocks and said grid walls whereby the ice blocks are released from said grid structure and fall into the storage zone in said chamber.

2. In an ice making apparatus, the combination of an insulated chamber having a freezing device therein including a stationary tray and a unitary grid structure removably disposed in said tray, said grid structure having walls movably interlocked together for dividing the interior of said tray into a plurality of compartments in which water is to be frozen into ice blocks, a support for supporting said device in said chamber, an ice block receiving and storage zone in said chamber, means for movably mounting said unitary grid structure within said chamber in association with said stationary tray, mechanical means for transporting said grid together with ice blocks bonded to walls thereof upwardly out of and over a side of said stationary tray beyond the vertical plane occupied thereby, said mechanical means including means for moving walls of said unitary grid structure relative to one another, after the grid structure has been transported over said side of said stationary tray, to break the bond between ice blocks and said grid walls, and said mechanical means also including means for jarring said grid structure, after its walls have been moved relative to one another, to shake said walls and release ice blocks cohering thereto therefrom whereby the ice blocks fall into the storage zone in said chamber.

3. In an ice making apparatus, the combination of an insulated chamber having a freezing device therein including a stationary tray and a unitary grid structure removably disposed in said tray, said grid structure having walls movably interlocked together for dividing the interior of said tray into a plurality of compartments in which water is to be frozen into ice blocks, a support for supporting said device in said chamber, an ice block receiving and storage zone in said chamber, means for movably mounting said unitary grid structure within said chamber in association with said stationary tray, mechanical means for transporting said grid together with ice blocks bonded to walls thereof upwardly out of and over a side of said stationary tray beyond the vertical plane occupied thereby, said mechanical means including means for moving walls of said unitary grid structure relative to one another, after the grid structure has been transported over said side of said stationary tray, to break the bond between ice blocks and said grid walls, a rigid comb-like element stationarily mounted in said chamber in the path of movement of said grid structure relative to said stationary tray, and said mechanical means also transporting said grid structure, after its walls have been moved relative to one another, into association with said comb-like element whereby the teeth thereof engage and release ice blocks cohering to said grid walls therefrom and cause the ice blocks to fall into the storage zone in said chamber.

4. In an ice making apparatus, the combination of an insulated chamber having a freezing device therein including a stationary tray and a unitary grid structure removably disposed in said tray, said grid structure having walls movably interlocked together for dividing the interior of said tray into a plurality of compartments in which water is to be frozen into ice blocks, a support for supporting said device in said chamber, an ice block receiving and storage zone in said chamber, means for movably mounting said unitary grid structure within said chamber in association with said stationary tray, mechanical means for transporting said grid together with ice blocks bonded to walls thereof upwardly out of and over a side of said stationary tray beyond the vertical plane occupied thereby, said mechanical means including means for moving walls of said unitary grid structure relative to one another, after the grid structure has been transported over said side of said stationary tray, to break the bond between ice blocks and said grid walls, said mechanical means including means for jarring said grid structure, during transportation of same and after its walls have been moved relative to one another, to shake said walls, a rigid comb-like element stationarily mounted in said chamber in the path of movement of said grid structure relative to said stationary tray, and said mechanical means also transporting said grid structure, after moving its walls relative to one another and jarring same, into association with said comb-like element whereby teeth thereof engage and release ice blocks remaining cohered to said grid walls therefrom and cause the ice blocks to fall into the storage zone in said chamber.

5. In an ice making apparatus, the combination of an insulated chamber having a freezing device therein including a stationary tray and a unitary grid structure removably disposed in said tray, said grid structure having walls movably interlocked together for dividing the interior of said tray into a plurality of compartments in which water is to be frozen into ice blocks, a support for supporting said device in said chamber, an ice block receiving and storage zone in said chamber, means for movably mounting said unitary grid structure within said chamber in association with said stationary tray, mechanical means for imparting a force to said stationary tray to twist same from end to end and free ice blocks bonded to walls of said grid structure from the tray, said mechanical means including means for thereafter transporting said grid together with ice blocks bonded to its walls upwardly out of and over a side of said stationary tray beyond the vertical plane occupied thereby, and said mechanical means including means for then moving walls of said unitary grid structure relative to one another to break the bond between ice blocks and said grid walls whereby the ice blocks are released from said grid structure and fall into the storage zone in said chamber.

6. In an ice making apparatus, the combination of an insulated chamber having a freezing device therein including an elongated stationary tray and a unitary grid structure disposed in said tray, said grid structure having walls movably interlocked together for dividing the interior of said tray into a plurality of compartments in which water is to be frozen into ice blocks, a support for said device, an ice block receiving and storage zone in said chamber, means pivotally mounting said unitary grid structure in association with said stationary tray for rotation relative thereto about an axis paralleling the length thereof, mechanical means for rotating said grid together with ice blocks bonded to its walls about said axis upwardly out of and into a substantially inverted position at one long side of said elongated stationary tray, and said mechanical means including means shiftable along the axis of rotation of said grid structure, after it has been rotated out of said stationary tray, for moving the interlocked together walls thereof relative to one another to break the bond between ice blocks and said grid walls whereby the ice blocks are released from the grid structure and fall in a plane beyond the vertical plane occupied by said stationary tray into the storage zone in said chamber.

7. In an ice making apparatus, the combination of an insulated chamber having a freezing device therein including an elongated stationary tray and a unitary grid structure disposed in said tray, said grid structure having walls movably interlocked together for dividing the interior of said tray into a plurality of compartments in which water is to be frozen into ice blocks, a support for said device, an ice block receiving and storage zone in said chamber, means pivotally mounting said unitary grid structure in association with staid stationary tray for rotation relative thereto about an axis paralleling the length thereof, mechanical means for imparting a force to said stationary tray to twist same and free ice blocks bonded to walls of said grid structure from the tray, said mechanical means including means for rotating said grid together with ice blocks bonded to its walls about said axis upwardly out of and into a substantially inverted position at one long side of said elongated stationary tray, and said mechanical means also including means shiftable along the axis of rotation of said grid structure, after it has been rotated out of said stationary tray, for moving the interlocked together walls thereof relative to one another to break the bond between ice blocks and said grid walls whereby the ice blocks are released from the grid structure and fall in a plane beyond the vertical plane occupied by said stationary tray into the storage zone in said chamber.

8. In an ice making apparatus, the combination of an insulated chamber having a freezing device therein including an elongated stationary tray and a unitary grid structure disposed in said tray, said grid structure having walls movably interlocked together for dividing the interior of said tray into a plurality of compartments in which water is to be frozen into ice blocks, a support for said device, an ice block receiving and storage zone in said chamber, means pivotally mounting said unitary grid structure in association with said stationary tray for rotation relative thereto about an axis paralleling the length thereof, mechanical means for rotating said grid together with ice blocks bonded to its walls about said axis upwardly out of and into a substantially inverted position at one long side of said elongated stationary tray, said mechanical means including means shiftable along the axis of rotation of said grid structure, after it has been rotated out of said stationary tray, for moving the interlocked together walls thereof relative to one another to break the bond between ice blocks and said grid walls, and said mechanical means also including means for imparting a jar to said grid structure, after its walls have been moved relative to one another, to shake said walls and release ice blocks cohering thereto therefrom whereby the ice blocks fall in a plane beyond the vertical plane occupied by said stationary tray into the storage zone in said chamber.

9. In an ice making apparatus, the combination of an insulated chamber having a freezing device therein including an elongated stationary tray and a unitary grid structure disposed in said tray, said grid structure having walls movably interlocked together for dividing the interior of said tray into a plurality of compartments in which water is to be frozen into ice blocks, a support for said device, an ice block receiving and storage zone in said chamber, means pivotally mounting said unitary grid structure in association with said stationary tray for rotation relative thereto about an axis paralleling the length thereof, mechanical means for rotating said grid together with ice blocks bonded to its walls about said axis upwardly out of and into a substantially inverted position at one long side of said elongated stationary tray, said mechanical means nicluding means shiftable along the axis of rotation of said grid structure, after it has been rotated out of said stationary tray, for moving the interlocked together walls thereof relative to one another to break the bond between ice blocks and said grid walls, a rigid comb-like element stationarily mounted on said support in the path of rotation of said grid structure relative to said stationary tray, and said mechanical means further rotating said grid structure, after its walls have been moved relative to one another, into cooperation with said stationary comb-like element whereby the teeth thereof engage and release ice blocks cohering to said grid walls therefrom and cause the ice blocks to fall clear of said stationary tray into the storage zone in said chamber.

References Cited in the file of this patent

UNITED STATES PATENTS

| | | |
|---|---|---|
| 529,345 | Church | Nov. 13, 1894 |
| 1,279,608 | Summers | Sept. 24, 1918 |
| 2,037,417 | Hull | Apr. 14, 1936 |
| 2,117,658 | Gilliam | May 17, 1938 |
| 2,181,593 | Whitaker | Nov. 28, 1939 |
| 2,227,700 | Buchanan | Jan. 7, 1941 |
| 2,342,670 | Jennings | Feb. 29, 1944 |
| 2,364,559 | Storer | Dec. 5, 1944 |
| 2,389,317 | Kitto | Nov. 20, 1945 |
| 2,415,451 | Synnestvedt | Feb. 11, 1947 |
| 2,701,453 | Henderson | Feb. 8, 1955 |